United States Patent
Aziz (12) 
(10) Patent No.: US 6,330,671 B1
(45) Date of Patent: Dec. 11, 2001

(54) METHOD AND SYSTEM FOR SECURE DISTRIBUTION OF CRYPTOGRAPHIC KEYS ON MULTICAST NETWORKS

(75) Inventor: Ashar Aziz, Islamabad (PK)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/880,201

(22) Filed: Jun. 23, 1997

(51) Int. Cl.$^7$ ........................................................ H04L 9/00
(52) U.S. Cl. ........................... 713/163; 380/277; 380/278
(58) Field of Search .................. 380/21, 49, 255, 380/262, 277–286, 44–45; 713/163, 155

(56) References Cited

U.S. PATENT DOCUMENTS

| | | | | |
|---|---|---|---|---|
| 5,109,384 | * | 4/1992 | Tseung | 371/32 |
| 5,369,705 | * | 11/1994 | Bird et al. | 380/21 |
| 5,668,877 | * | 9/1997 | Aziz | 380/30 |
| 5,729,608 | * | 3/1998 | Janson et al. | 380/21 |
| 5,748,736 | * | 5/1998 | Mittra | 380/21 |

FOREIGN PATENT DOCUMENTS 0 575 279    12/1993    (EP) .............................. H04L/12/24

OTHER PUBLICATIONS

IEEE Communications Magazine, vol. 35, No. 6, pp. 130–134.
Proceedings of the IFIP TC6 International Conference on Information Networks and Data Communication, vol. Conf. 5, pp. 367–380.

* cited by examiner

*Primary Examiner*—Gail Hayes
*Assistant Examiner*—Ho S. Song
(74) *Attorney, Agent, or Firm*—Beyer Weaver & Thomas LLP (57) ABSTRACT

A method and apparatus for secure and scalable key management in a multicast network environment is provided. In a first portion, one or more seed nodes on the network receive a multicast transmission request for a cryptographic key from a requesting node. The seed node compares the identity of the requesting node with an authenticated predetermined list of nodes having permission to receive the cryptographic key. If the comparison indicates the requesting node is not a member of the authenticated predetermined list, the seed node denies the multicast request. However, if the comparison indicates that the requesting node is a member of the predetermined list of nodes, the cryptographic key is transmitted using a secure unicast key distribution technique such as SKIP. A second portion concerns the requesting node which generates a multicast request to obtain the cryptographic key from one or more seed nodes and one or more keyed nodes on the internetwork. The multicast request for the cryptographic key is initially transmitted a minimum hop count over the internetwork to locate the closest seed node. The requesting node delays a brief time period waiting for at least one response from at least one seed node or keyed node on the internetwork. If the at least one response is not received within this time period, the minimum hop count is increased by a hop count increment and the requesting node repeats the above steps. Eventually, the requesting node increases the hop count and receives the cryptographic key over a secure unicast key management technique such as SKIP. As a final step, the requesting node is convered into a keyed node. The keyed node acts as a seed node and provides the cryptographic key to other requesting nodes on the internetwork.

45 Claims, 4 Drawing Sheets

METHOD AND SYSTEM FOR SECURE DISTRIBUTION OF CRYPTOGRAPHIC KEYS ON MULTICAST NETWORKS

FIELD OF THE INVENTION

The present invention relates generally to computer cryptography and, more specifically, to a method and system for secure distribution of cryptographic keys on multicast networks.

BACKGROUND OF THE INVENTION

Network computing has grown at a phenomenal rate over the last decade. In a network computing environment, a user has access to the computing power of multiple computers located on a network. Sun Microsystems Inc., a leader in network computing, even devised a marketing campaign around the slogan "The Network Is the Computer"™ to emphasize the commercial success of this growing segment of the computing market[1]. Recently, this slogan has become reality as millions of users have tapped the computing resources available from the thousands of computers available on the Internet and the World Wide Web.

1. The Network Is the Computer, Sun, the Sun logo, Sun Microsystems, Solaris, Ultra and Java are trademarks or registered trademarks of Sun Microsystems, Inc. in the United States and in other countries. All SPARC trademarks are used under license and are trademarks or registered trademarks of SPARC International, Inc. in the United States and other countries. Products bearing SPARC trademarks are based upon an architecture developed by Sun Microsystems, Inc. UNIX is a registered trademark in the United States and other countries exclusively licensed through X/Open Company, Ltd.

One of the more interesting areas of research in network computing concerns how to simultaneously and efficiently transmit information to multiple nodes on a network. In particular, many people are researching multicast protocols. A multicast protocol allows a transmitter node on a network to send the same data packets to multiple specific receiver nodes on a network without using separate point-to-point connections. The point-to-point connections, also referred to as unicast connections, are not desireable because each point-to-point connection establishes a seperate logical network connection between the transmitter node and each receiver node on the network. The seperate logical network connection requires seperate network resources, such as a seperate IP (Internet Protocol) connection, to establish the actual connection as well as additional bandwidth to transmit multiple copies of the same packet. This wastes network resources because the information being transmitted over each network connection is identical.

The multicast protocol enables the transmitting node to transmit a series of data packets to multiple receivers without establishing a seperate network connection for each receiver node or sending duplicate packets of the data over a network. Instead, the multicast protocol sends a single stream of packets over the network in which only members of the multicast group are able to read. Multicast is an improvement over unicast protocols using numerous point-to-point channels because multicast does not send redundant packets of information. Multicast is also advantageous because only a predetermined list of multicast members can receive the multicast transmission.

An increasing number of practical applications available on the Internet such as live stock quotes, video conferencing, white board applications, electronic commerce, remote learning, and other group communications are migrating to multicast protocols to resolve these network bandwidth deficiencies. These applications will invariably contain sensitive and confidential information about their users. Consequently, packets transmitted over these multicast networks should be encrypted to prevent eavesdropping by individuals not in the multicast group.

Accordingly, there are at least two general concerns in designing robust cryptographic systems for encrypting information distributed on a multicast network: encryption and key management. First, the encryption technique used to encrypt the information must not be easily compromised by an unauthorized eavesdropper. To evade such eavesdroppers, algorithms such as Data Encryption Standard (DES) are used to to encrypt data using a cryptographic key. The protection against hackers and interlopers lies in the length of the cryptographic key in addition to the complexity of the encryption algorithm. Generally, a longer cryptographic key requires more computer resources and more time to decrypt. Thus, by changing the cryptographic keys at regular time intervals, hackers will not have sufficient time to compute the cryptographic keys.

The second, and often more difficult, aspect of cryptographic systems lies in the key management. Key management typically involves secure key distribution and scalability. Essentially, key distribution must be secure or a hacker will obtain the key and security will be compromised. Moreover, in a large multicast network the key distribution must scale well so that a large number of users can obtain the keys quickly and efficiently. The size of the multicast group and request for keys should not degrade performance of the cryptographic system. Establishing management techniques which scale well for large multicast groups has remained a problem in cryptographic systems.

Typically, modern cryptographic systems use key management to manage distribution of a traffic key and a key encrypting key. The traffic key is a key used to actually encrypt the data being transmitted across a network while the key encrypting key is a key used to encrypt the traffic key and prevent it from being discovered enroute to a receiving node. Both of these keys must be distributed in a manner which scales to multicast networks with a large number of multicast members.

Unfortunately, existing key management techniques often use a single server, sometimes referred to as a Group Coordinator or GC, to distribute the traffic keys or key encrypting keys associated with a multicast transmission. The GC maintains secure key distribution but can be overwhelmed if the requests are too frequent and too numerous. In some cases, requesting nodes geographically distant from the single server will experience delays in receiving a key and can miss part, if not all, of a multicast transmission in the interim. In a worst case, a large multicast group can suddenly overload the GC with requests such that certain members of the multicast group never receive any keys. Members of the multicast group without the appropiate keys would be excluded from the multicast transmission entirely. Key management techniques must be improved to scale with large multicast groups.

A multicast extension using the SKIP 1 (Simple Key Management for Internet Protocols) protocol scales well for distributing the traffic key but does not scale as well for distributing the key encrypting key. In multicast SKIP, the traffic key is used to encrypt data in a packet. The traffic key is an inline traffic key because it is included with each packet. To keep the traffic key confidential, SKIP for multicast IP (Internet Protocol) encrypts the traffic key using a key encrypting key referred to as a Group Interchange Key or GIK.

1.Solstice™ PC-SKIP™ SunScreen™ SKIP are trademarks of Sun Microsystems, Inc.

Distribution of the traffic key in multicast SKIP scales well to large multicast groups because each member of the multicast group receiving a packet has a copy of the traffic key. However, the distribution of the GIK does not scale as easily. Unlike the inline traffic key, SKIP uses public-key key distribution to distribute the GIK with a single server known as the Group Controller or GC. When membership in the multicast group gets too large and geographically spread out, the GC can have difficulty distributing the GIK. Thus, while traffic key distribution using an inline traffic key is highly scalable, the distribution of the GIK from a single GC remains only moderately scalable. Details on multicast SKIP are included in the paper entitled "Design and Implementation of SKIP", authored by Ashar Aziz and Martin Patterson, Jun. 28, 1995.

Other existing key-management techniques which have not addressed scalable key distribution techniques also suffer problems similar to the ones discussed above. One technique called Group Key Management Protocol (GKMP[1]) contemplates that the GIK (referred to in GKMP as a "traffic key") can be distributed by individual members of a multicast group but does not indicate an efficient and secure technique for selecting members of the multicast group to distribute the key encrypting key. Further, GKMP does not discuss a secure means in which key requests for the GIK are fulfilled. Essentially, the GKMP technique can still overload a group owner or group coordinator with key requests because the load associated with fulfilling these key requests is not necessarily distributed evenly over multiple servers.

[1].IETF Internet-Draft Group Key Management Protocol Architecture, Hugh Harney and Carl Muckenhirn, SPARTA, Inc. Jun. 18, 1996

Another technique discussed in RFC 1949 addresses multicast key distribution in the context of a specific multicast routing protocol using Core Based Trees (CBT). This scheme has the drawback of tying the key distribution to a specific multicast routing protocol, namely CBT. Moreover, it also suffers from the problem of having to involve and trust entities whose role is determined by virtue of the multicast routing protocol. Unfortunately, the CBT multicast routing protocol determines the efficiency of transmitting multicast data based on a particular route and not based on which nodes on the network are to be trusted as a secure node for distributing a key.

What is needed is a technique for managing keys on a secure network which scales based on the load and geographic location of a rapidly growing multicast group. This technique should not compromise the level of security during transmission or reduce either forward or reverse secrecy.

SUMMARY OF THE INVENTION

Embodiments of the present invention provide a method and apparatus for secure and scalable key management in a multicast network environment. One embodiment of the present invention securely distributes a multicast cryptographic key, initially located on one or more seed nodes, to a requesting node. In one multicast environment the multicast cryptographic key is a key encrypting key called a group interchange key (GIK) and is used to encrypt a multicast traffic key. Accordingly, the seed nodes in this one embodiment are one or more nodes on the network which initially hold the GIK and are capable of securely distributing the GIK in accordance with principles of the present invention. Generally, seed nodes are distributed in the network so they are geographically close to the concentration of requesting nodes in the network.

Initially, one or more seed nodes on the network receives a multicast transmission request for the multicast cryptographic key from a requesting node. The multicast request is neither encrypted nor authenticated and therefore is insecure. Typically, the seed node closest to the requesting node receives the request first and responds. The closest seed node determines if the requesting node making the multicast request has permission to receive the multicast cryptographic key by performing several steps. First, the seed node compares the identity of the requesting node with an authenticated list of nodes having permission to receive the multicast cryptographic key. If the comparison indicates the requesting node is not a member of the authenticated predetermined list of nodes having permission to receive the multicast cryptographic key, the seed node denies the multicast request. However, if the comparing step indicates the requesting node is a member of the predetermined list of nodes having permission to receive the multicast cryptographic key, the multicast cryptographic key is transmitted using a secure unicast key distribution technique such as unicast SKIP.

Unlike existing key management techniques, a requesting node can request a multicast cryptographic key from a number of different seed nodes on the network. This technique off loads the processing from a single seed node or group controlloer (GC) because any one of the seed nodes on the network can distribute the multicast cryptographic key.

This technique is also advantageous because an insecure multicast request requires less processing on the part of the seed node than a secure multicast request which is encrypted and authenticated. Despite using an insecure request, a multicast key distribution technique implemented in accordance with principles of the present invention remains secure because the seed node distributes a multicast cyptographic key using a secure unicast key management technique such as unicast SKIP.

A second embodiment of the present invention executed on the requesting node enables the requesting node to obtain a multicast cryptographic key from the seed node closest to the requesting node on the internetwork using an expanding ring of requests. Further, once the requesting node receives the multicast crytographic key, the second embodiment converts the requesting node into a keyed node which can then distribute the multicast cryptographic key to subsequent requesting nodes in the multicast group. Unlike the seed node, the keyed node initially does not have a copy of the multicast cryptographic key and can not distribute the multicast cryptographic key until the requesting node's request for the multicast cryptographic key is successfully filled.

In accordance with the second embodiment, the requesting node generates a multicast request to obtain the multicast cryptographic key from one or more seed nodes and one or more keyed nodes on the internetwork. The multicast request for the multicast cryptographic key is initially transmitted a minimum hop count over the internetwork to locate the closest seed node. The hop count provides an upper limit on the number of networks the request will traverse to locate a seed node. The requesting node delays a brief time period waiting for at least one response from at least one seed node or keyed node on the internetwork. If the at least one response is not received within this time period, the minimum hop count is increased by a hop count increment and the requesting node repeats the requesting process above. By increasing the hop count over time, an expanding ring of multicast key requests increases the likelihood of locating a seed node with the multicast cryptographic key while minimizing the amount of network traffic. Eventually, the requesting node increases the hop count and receives the multicast cryptographic key using a secure unicast key management technique such as unicast SKIP. As a final step, the requesting node is converted into a keyed node which provides the multicast cryptographic key to other requesting nodes on the internetwork.

Embodiments of the invention offer several advantages in the area of key management for use in encryption systems which were previously unavailable in the art. Unlike existing techniques, this key management system scales well in a large multicasting networks with members spread out over a large geographic distance. In the past, a single group coordinator (GC) would become quickly overwhelmed if all the members in a multicast group requested an encryption key in a short time interval. For example, the multicast SKIP protocol used a single GC to distribute the multicast cryptographic key, called the group interchange key (GIK), to each member of the multicast group who wanted to receive multicast transmissions. This worked well for small multicast groups but did not scale well for larger multicast groups. By enhanching SKIP with teachings of the present invention, the processing associated with distributing the key is spread out to multiple seed nodes and keyed nodes on the internetwork. This technique minimizes the demand on a central GC because members of the multicast group can request a GIK from the nearest keyed node or seed node rather than one centrally located GC. The expanding ring of multicast requests further exploits the availability of cryptographic keys on multiple seed nodes and keyed nodes on a network by making requests for the multicast cryptographic key from the closest seed nodes and keyed nodes.

The techniques used by the present invention are also beneficial because they balance the processing load associated with key distribution based on the geographic location of key requests. Each additional cryptographic key request establishes a keyed node which can distribute the cryptographic key to other nearby nodes on the internetwork. Using multiple seed nodes and keyed nodes to distribute the multicast cryptographic key distributes the processing load to many different nodes rather than one group controlloer or GC.

Further, requesting a cryptographic key using an expanding ring locates nearby seed nodes or keyed nodes rather than a distant node on the network. This minimizes network traffic and makes key distribution fast and efficient. Consequently, members in a large multicast group will experience consistent key distribution performance when requesting cryptographic keys even if they are located in different geographic locations.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Environment/Preconditions

Figure 1:
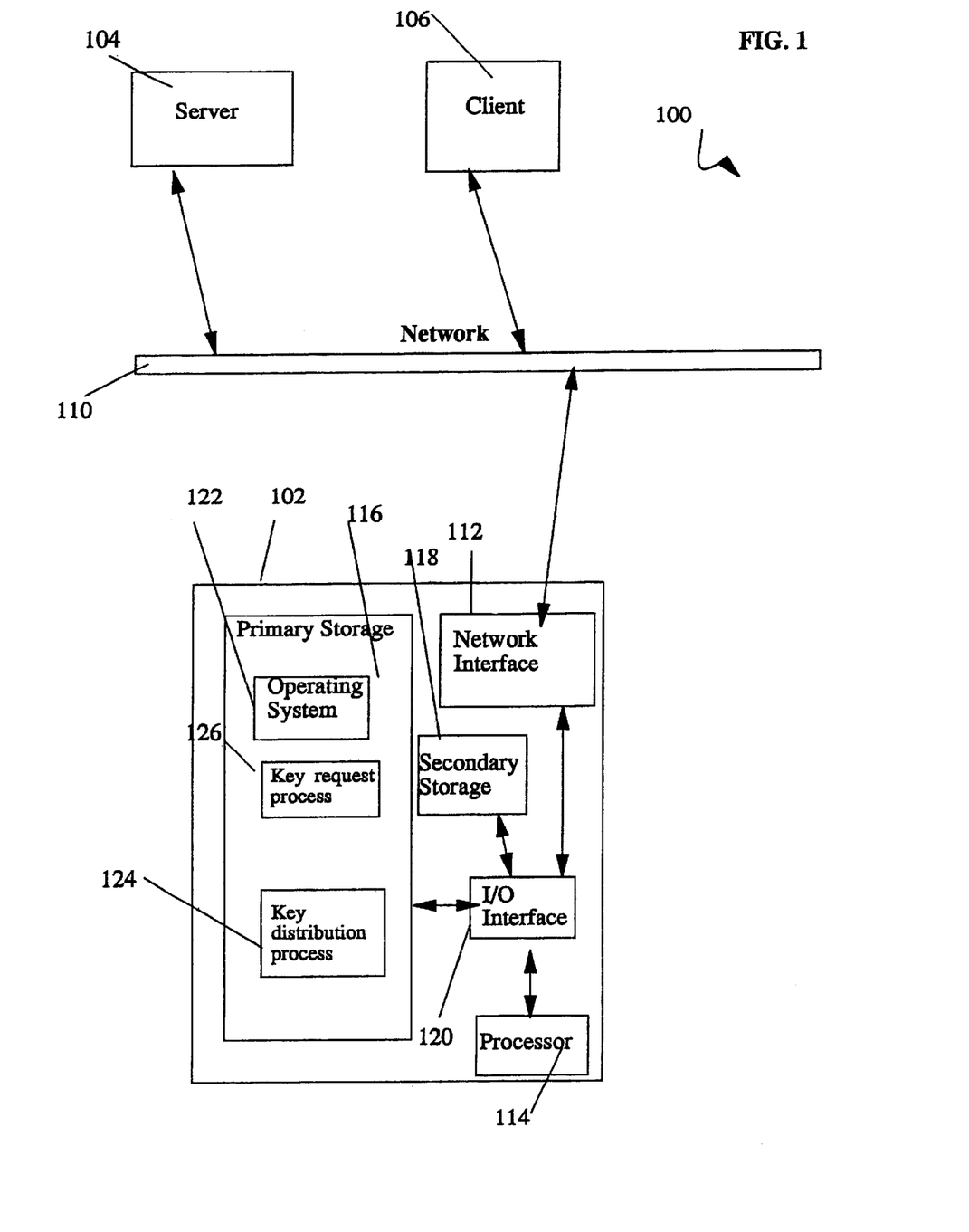
FIG. 1 illustrates a computer network for practicing one key-management technique for cryptographic systems in accordance with the present invention.

FIG. 1 illustrates a computer network 100 for practicing a key-management technique for cryptographic systems in accordance with the present invention. Generally, embodiments of the present invention are designed to be implemented in an internetwork which require a keymanagement technique for the securely distributing cryptographic keys for multicast transmissions. As will be apparent from the discussion below, embodiments of the present invention exhibit exceptional scalability in large key-management scenarios by strategically distributing the associated processing load. For example, this key-management technique is particularly useful in secure multicast transmissions where the cryptographic key must be distributed to a large multicast group having members spread out over a large geographic area.

Referring to FIG. 1, computer network 100 includes server computers 102 and 104 configured to communicate with a client computer 106 over a network 110.

Server 102 includes a network interface 112, a processor 114, a primary storage 116, a secondary storage 118, and an I/O (input output) interface 120 which facilitates communication between these aforementioned elements. Network interface 112 couples server 102 to network 110 and facilitates two-way data communication between server computer 102 and other computers on the network 110. For example, if network interface 112 is an integrated services digital network (ISDN) card or a modem, network interface 112 provides a physical connection to the corresponding type of telephone line. If network interface 112 is a local area network card (LAN) card, network interface 112 provides a physical connection to a compatible LAN. Wireless links are also possible. Preferably, the client and server computers coupled to this network transmit information utilizing the TCP/IP protocol. Other network protocols such as SNA, X.25, Novell Netware[1], Vines, or AppleTalk could also be used to provide similar client-server communication capabilities. In any such implementation, network interface 112 sends and receives electrical, electromagnetic, or optical signals which carry digital data streams representing various types of information.

1. Netware is a registered trademark of Novell, Inc. in the United States and other countries.

Network 110 typically provides data communication through one or more networks to other data devices. For example, network 110 can provide a network connection between server 102 and client 106, in part, using a world wide packet data communication network now commonly referred to as the "Internet". The Internet uses electrical, electromagnetic, or optical signals to carry digital data streams representing various types of information. The signals carried through network 110 and through network interface 112, which carry the digital data to and from server 102, are exemplary forms of carrier waves transporting the information.

Server 102 can send messages and receive data, including program code, through network 110, and network line 112. In the Internet example, a server computer 104 might transmit a requested code for an application program through the Internet using network 110 to server computer 102. In accord with the invention, one such downloaded application is Method and System for SEcure Distribution of Cryptographic Keys on Multicast Networks and described herein. The received code can be executed by server computer 102 as it is received, and/or stored in a storage device for later execution. In this manner, server computer 102 can obtain application code in the form of a carrier wave.

Typically, processor 114 on server 102 fetches computer instructions from primary storage 116 through I/O interface 120. After retrieving these instructions, processor 114 executes these the computer instructions. Executing these computer instructions enables the processor 114 to retrieve data or write data to primary storage 116, secondary storage 118, display information on one or more computer display devices (not shown), receive command signals from one or more input devices (not shown), or retrieve data or write data to other computer systems coupled to network 110 such as server 104, and client 106. Those skilled in the art also understand that primary storage 116 and secondary storage 118 can include any type of computer storage including, without limitation, randomly accessible memory (RAM), read-only-memory (ROM), magnetic storage devices and optical storage media such as CD-ROM. In one embodiment, processor 114 can be any of the SPARC compatible processors, UltraSPARC compatible processors or JAVA[1] compatible processors available from Sun Microsystems, Inc. of Mountain View, Calif. Alternatively, processor 114 can be based on the PowerPC processor available from Motorola of Schaumburg, Ill., or any of the Pentium or x86 compatible processors available from the Intel Corporation or other corporations such as AMD, and Cyrix.

1.JAVA, PicoJAVA, UltraJAVA, HotJAVA, The Network Is the Computer, Sun, the Sun logo, Sun Microsystems, Solaris, and Ultra are trademarks or registered trademarks of Sun Microsystems, Inc. in the United States and in other countries. All SPARC trademarks are used under license and are trademarks or registered trademarks of SPARC International, Inc. in the United States and other countries. Products bearing SPARC trademarks are based upon an architecture developed by Sun Microsystems, Inc. UNIX is a registered trademark in the United States and other countries exclusively licensed through X/Open Company, Ltd.

Primary storage 116 includes an operating system 122 for managing computer resources. Preferably, this operating system is the Solaris operating system or any operating system with support for object oriented programming languages such as the JAVA programming language or high level programming languages such as C. Also included in primary storage 116 is a key distribution process 124 designed in accordance with the present invention and a key request process 126 also designed in accordance with the present invention. Embodiments of key distribution process 124 concern the secure distribution of a multicast cryptographic key from one or more seed nodes or one or more keyed nodes to one or more requesting nodes. Generally, the requesting nodes are coupled to different networks on an internetwork and are requesting the multicast cryptographic key to participate in a multicast transmission. In another embodiment of the present invention, key request process 126 generally concerns how the one or more requesting nodes request the multicast cryptographic key from the one or more seed nodes and the one or more keyed nodes. Accordingly, key distribution process 124 and key request process 126 work together in a client-server relationship as discussed in further detail below. This client-server relationship reduces traffic and distributes the load associated with key management in a large multicast group. Those skilled in the art will understand that the multicast cryptographic key can be used as traffic keys, which encrypts multicast data directly, or as a key encrypting key used to encrypt traffic keys rather than the actual data.

In one aspect of the present invention, key distribution process 124 provides an improved method and apparatus for distributing a multicast cryptographic key to a requesting node from either a "seed" node or a "keyed" node. In this context, the requesting node is a node on the network which needs the multicast cryptographic key to decrypt data packets being transmitted over the network. The "seed" node includes any node on the network initially "seeded" with the multicast cryptographic key being requested. In contrast to the "seed" node, the "keyed" nodes are those nodes which receive the multicast cryptographic key only after requesting the multicast cryptographic key vis a vis embodiments of the present invention. The seed node or keyed closest to the requesting node on the network provides the multicast cryptographic key to the requesting node. Details on seed nodes and keyed nodes are discussed in further detail below.

Figure 2:
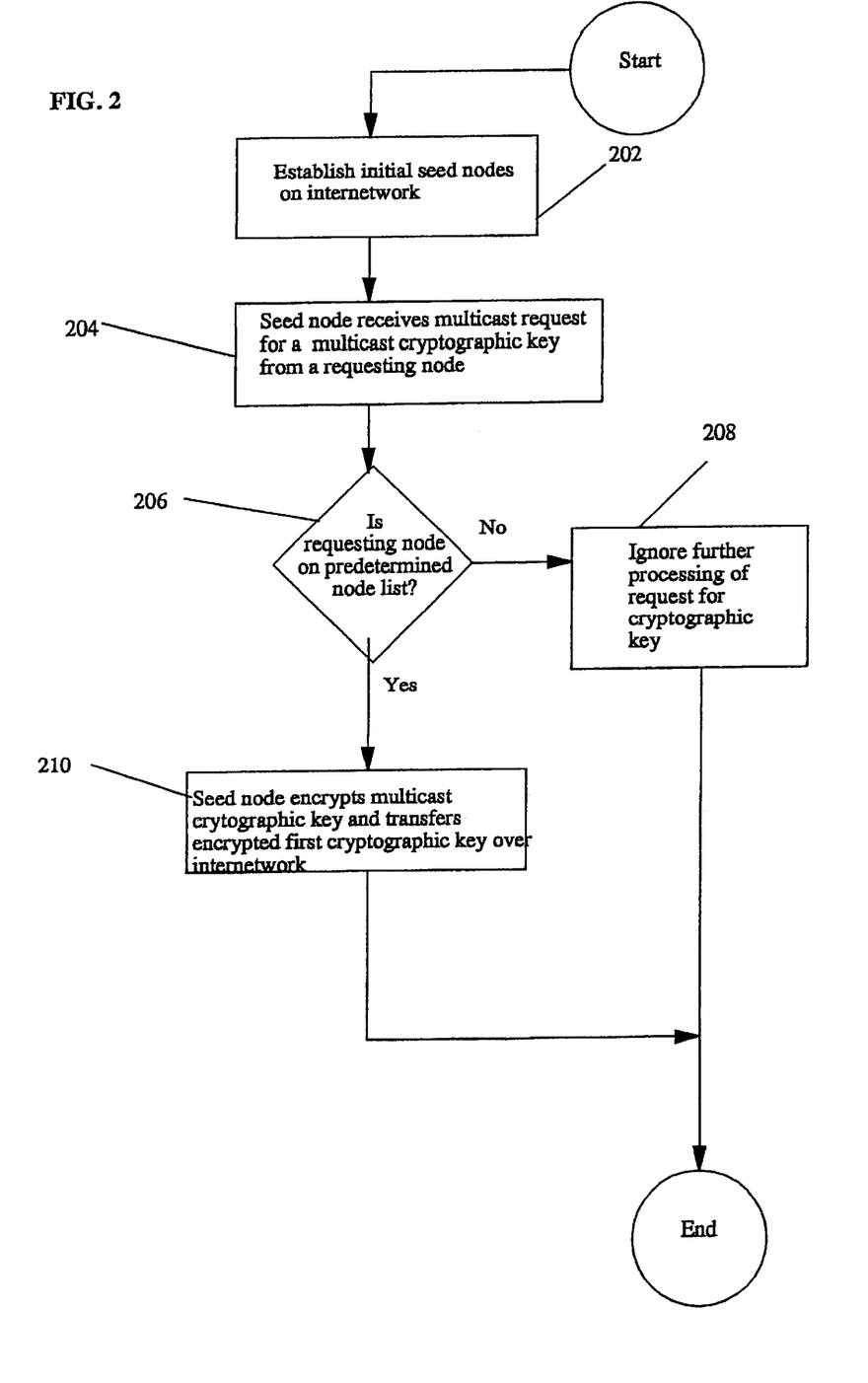
FIG. 2 is a flow chart indicating the overall steps used in accordance with one embodiment of the present invention to distribute a multicast cryptographic key to a requesting node from either a seed node or a keyed node.

Referring to FIG. 2, a flow chart indicates the overall steps used by one embodiment of the present invention to distribute a multicast cryptographic key from either a seed node or a keyed node to a requesting node. Initially, step 202 establishes the seed nodes on the network when a multicast group is created. Seed nodes initially receive the multicast cryptographic key before the other members of the multicast group. Typically one seed node is used if the size of the multicast group is small and restricted to a small geographic area. Multiple seed nodes are generally used if the multicast group is large and spread out over a large geographic area. For example, if the group membership spans a wide geography, multiple seed members are strategically placed close to large subsets of the multicast group members. Consequently, a multicast group including members in eastern Europe and the western United States would have multiple seed members placed in various locations in eastern Europe and the western United States to improve the key distribution process.

At step 204 one of the seed nodes established in step 202 receives a multicast transmission for a multicast cryptographic key from a requesting node. Typically, the multicast request is made using an insecure transmission technique over a well known port on the network. The insecure multicast request is generally processed move quickly and efficiently than a secure request because the insecure request is neither authenticated nor encrypted. As will be apparent from the discussion below, using insecure request at this stage does not compromise the security of the overall key distribution technique.

Next, processing transfers from step 204 to determination step 206 where the seed node determines if the requesting node has permission to receive the multicast cryptographic key. The purpose of this step is to limit the access to multicast transmission to only the members of the multicast group. Initially, the seed node compares the requesting node's identity with an authenticated predetermined list of nodes having permission to receive the requested multicast cryptographic key. If the comparison indicates the requesting node is not member of multicast group, processing transfers from step 206 to step 208 where the seed node denies the multicast request. However, if the comparison indicates that the requesting node is a member of the predetermined list of nodes, processing will transfer from step 206 to step 210 where the seed node responds to the multicast request for the multicast cryptographic key. In one embodiment, the authenticated predetermined list of nodes is an access control list or ACL. Typically, the ACL is authenticated using a digital signature and distributed to each member of the multicast group prior to the multicast transmission using techniques well known to those skilled in the art. The ACL includes all the nodes approved for inclusion in the secure multicast transmission.

Assuming the requesting node is on the authenticated predetermined list of nodes, processing transfers from step 206 to step 210 where the seed node transfers the multicast cryptographic key over the network to the requesting node using a secure unicast key management technique such as unicast SKIP. Unicast SKIP uses public key key-distribution techniques. Public key key-distribution is advantageous because keys can be distributed quickly, efficiently, and securely over an internetwork. For example, a seed node using unicast SKIP has a private key i and a certified public key $g^i$ mod p. Similarly, the particular requesting node has a private key j and a certified public key $g^j$ mod p. Both of the public keys are available to the public from a certified distributor in the form of a public key certificate. The seed node and requesting node pair can then calculate a mutually shared secret $g^{ij}$ mod p using the well known Diffie-Hellman algorithm. Specifically, the seed node and the requesting node calculate the shared secret based on knowledge of the other's identify and the corresponding public key certificate. Consequently, the actual shared secret does not need to be explicitly communicated to either the seed node or the requesting node over the internetwork.

Figure 4:
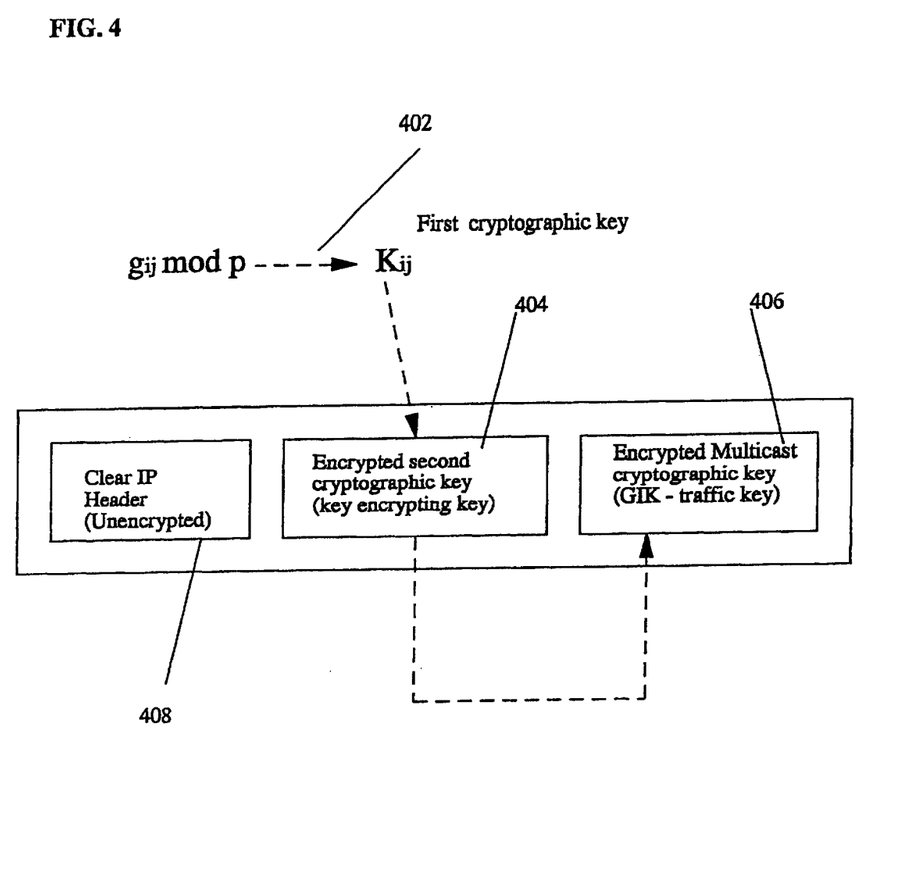
FIG. 4 illustrates one embodiment of an encrypted unicast packet generated for securely transmitting a GIK.

The mutually shared secret $g^{ij}$ mod p is used to derive a first cryptographic key, which is denoted $K_{ij}$. Initially, the seed node derives this first cryptographic key by taking the low-order bits of $g^{ij}$ mod p corresponding to the predetermined bit size of the third key. The seed nodes computes and uses the first key $K_{ij}$ as a master or key-encrypting key to encrypt a second cryptographic key. The second cryptographic key is a key-encrypting key and is used to encrypt the multicast encryption key. The multicast encryption key is the group interchange key or GIK used to encrypt multicast data transmitted over the network. The seed node sends the requesting node an encrypted unicast packet generated using the two step encryption procedure discussed above. FIG. 4 illustrates one embodiment of an encrypted unicast packet generated for securely transmitting a GIK. In SKIP, the second cryptographic key and the multicast cryptographic key are distirbuted in the packet transmitted over the internetwork between the seed node and the requesting node. Unicast packet illustrated in FIG. 4 includes a second cryptographic key 404 encrypted using a first key $K_{ij}$ 402 derived using a public key, a multicast cryptographic key or group interchange key 406 encrypted using second cryptographic key 404, and a clear header 408 utilized to route the unicast packet over the internetwork.

The requesting node receives the unicast packet and computes the first cryptographic key $K_{ij}$ in a similar manner to the seed node and decrypts the second cryptographic key. The requesting node then uses the second cryptographic key to decrypt the data packet and isolate the multicast cryptographic key for use later in the multicast transmission. It should be understood if an imposter poses as the requesting node, the second key and the multicast cryptographic key remain secure. The imposter requesting node can obtain the unicast data packet but will not have the correct private key associated with the true requesting node. This will prevent the imposter node from computing the shared secret value, deriving the first cryptographic key, decrypting the second cryptographic key, and consequently obtaining the multicast cryptographic key. Details on the use of secure unicast SKIP are included in U.S. Pat. No. 5,548,646 entitled "System for Signatureless Transmission and Reception of Data Packets Between Compuer Networks", authored by Ashar Aziz and Geoffrey Mulligan, assigned to the assigned of the present invention and herein incorporated by referenced in the entirety.

As previously discussed, a second portion of the present invention includes key request process 126 (FIG. 1). Accordingly, a requesting nodes uses key request process 126 to request the multicast cryptographic key, such as a group interchange key or GIK, from the one or more seed nodes and the one or more keyed nodes coupled to the internetwork. As will be apparent from the discussion below, a requesting node using key request process 126 will obtain a multicast cryptographic key from the keyed node or seed node closest to the requesting node at the time of the request. Compared with other nodes on the network, the closest seed node or keyed node can send a packet to the requesting node which traverses the least number of networks and thus uses the fewest number of hops.

Figure 3:
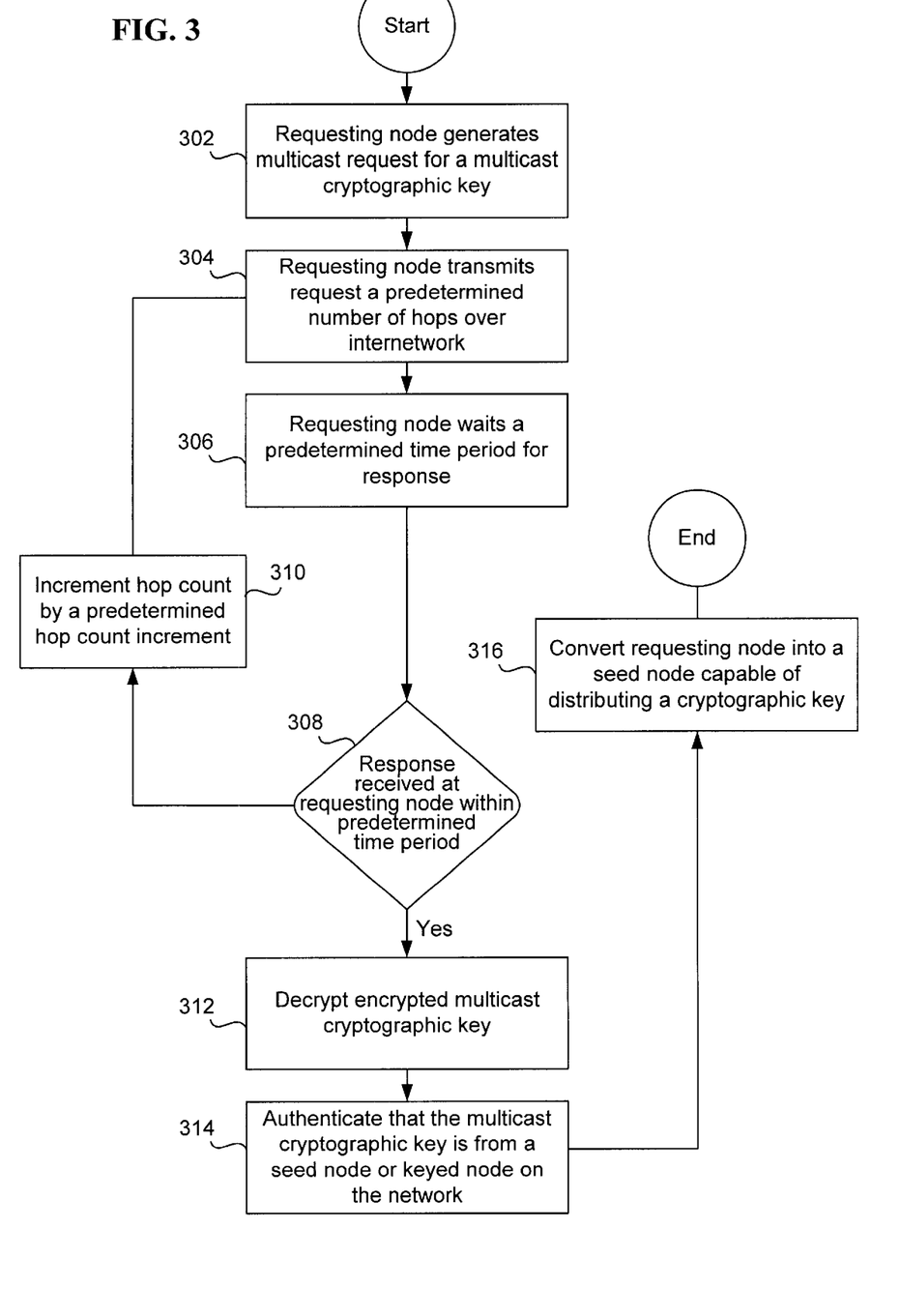
FIG. 3 is a flow chart outlining the overall steps used by one embodiment of the present invention to obtain a multicast cryptographic key.

Referring to FIG. 3, a flow chart outlines the overall steps used by one embodiment of the present invention to obtain the multicast cryptographic key. Initially, at step 302, the requesting node generates a multicast request for a multicast cryptographic key. The multicast request is transmitted over the internetwork and addressed to a special multicast address the seed nodes and keyed nodes are monitoring. It is important to note that the multicast request can be both unencrypted and unauthenticated without compromising overall security of the multicast key distribution process. Essentially, the seed nodes and keyed nodes receiving the request need only verify the requesting node is an authorized node based on the authorized control lists (ACL) because the response is encrypted in a manner only the real requesting node will be able to decrypt. An imposter node attempting "a man in the middle" or other similar cryptographic attacks can act as an authorized requesting node but can not decrypt the response which has been encrypted using a secure unicast transmission such as SKIP. This unique aspect of the present invention reduces the complexity associated with key management without compromising the level of security.

Next, at step 304, the requesting node transmits the multicast request a predetermined number of hops over the internetwork to nearby seed nodes and keyed nodes using an expanding multicast ring. The expanding multicast ring can be viewed as a series of messages transmitted over the internetwork using an increasing hop count. Those skilled in the art will understand that a hop is defined as the distance between two networks coupled together by a router, a switch, a bridge or other network connectivity device. Accordingly, each time a message travels between two networks, the network connectivity device decrements the hop count. Thus, the hop count measures how many networks away from the requesting node a message has travelled. Over time, the expanding multicast ring will send requests further out over the network looking for a seed nor or keyed node which has the multicast cryptographic key. The expanding multicast ring locates the closest seed nor or keyed node rather than requesting a key from a centrally located node which may be geographically distant. As will become apparent from the following steps, the expanding multicast ring distributes the load associated with the key-management process.

At step 306, the requesting node waits a predetermined time period for at least one response from either a seed node or a keyed node. Next, determination step 308 determines if at least one response has been provided within the predetermined time period. If no response has been received, the expanding multicast ring was not large enough to locate a seed node or keyed node. Thus, processing transfers to step 310 where the hop count is increased a predetermined hop count increment suitable under the circumstances. The applicant contemplates that various well known mathematical number sequences such as cardinal, prime, fibonacci and other mathematical relations could be used for this predetermined hop count increment. For example, the hop count sequence used in one expanding multicast ring could be an exponential sequence such as 1, 2, 4, 8, 16, . . . $n^2$ This hop count sequence would expand the multicast ring quickly and therefore locate the multicast cryptographic key quickly.

After increasing the hop count an appropriate number of times and performing steps 304–310 iteratively, the requesting node eventually receives a secure unicast transmission, including the multicast cryptographic key, from either a seed node or a keyed node coupled to the internetwork. If unicast SKIP is used, the multicast cryptographic key is encrypted using the two step encryption process discussed above. Accordingly, processing transfers from step 308 to step 312 where the destination node proceeds to decrypt the secure unicast transmission to obtain the multicast cryptographic key value.

At step 314 in FIG. 3 the receiving node determines if the multicast cryptographic key is authenticate or has been falsified by an imposter. Authentication can be done using several different techniques. One technique authenticates that the multicast cryptographic key is from a member of the multicast group using an access control list or ACL. This ACL is typically authenticated and distributed some time before the multicast transmission and contains all the members in the multicast group and, if they exist, includes any seed members and keyed members. Another authentication technique relies on the secure unicast response containing the multicast cryptographic key encrypted using public key encryption techniques such as the one described in unicast SKIP. Another technique authenticates the multicast cryptographic key by a digital signature on the multicast cryptographic key. This digital signature may be time-stamped in order to prevent old digitally signed group keys from being re-used by an imposter seed node. Those skilled in the art will understand how a multicast cryptographic key is signed and authenticated in the manner discussed above.

After authenticating the multicast cryptographic key, processing transfers to step 316 which converts the requesting node into a keyed node capable of distributing the multicast cryptographic key using similar techniques discussed above for the seed nodes. This enables the requesting node to distribute the cryptographic key to subsequent requesting nodes on the internetwork which are members of the multicast group and need the multicast cryptographic key. Thus, the seed node and the keyed nodes are functionally equivalent with respect to key distribution execpt that the seed node receives the multicast cryptographic key upon multicast group creation and the keyed node receives the multicast cryptographic key only after requesting and successfully receiving the multicast cryptographic key. Both the keyed node and the seed node are able to distribute the multicast cryptographic key over the internetwork. In one embodiment, the requesting node converts itself into a keyed node by invoking a process which allows the requesting node to distribute the multicast cryptographic key in the same manner as the seed nodes discussed above. In an alternative embodiment, a seed node can convert a requesting node into a keyed node capable of distributing the multicast cryptographic key. In this alternative embodiment, the seed node transfers key distribution software onto the requesting node and configures key distribution software to perform the same key distribution techniques performed by the seed node for distributing the multicast cryptographic key.

Embodiments of the invention offer several advantages in the area of key management for use in encryption systems which were previously unavailable in the art. Unlike existing techniques, this key management system scales well in a large multicasting network with members spread out over a large geographic distance. In the past, a single group coordinator (GC) would become quickly overwhelmed if all the members in a multicast group requested an encryption key in a short time interval. For example, the multicast SKIP protocol used a single GC to distribute the multicast cryptographic key, called the group interchange key (GIK), to each member of the multicast group who wanted to receive multicast transmissions. This worked well for small multicast groups but did not scale well for larger multicast groups. By enhancing SKIP with teachings of the present invention, the processing associated with distributing the key is spread out to multiple seed nodes and keyed nodes on the internetwork. This technique minimizes the demand on a central GC because members of the multicast group can request a GIK from the nearest keyed node or seed node rather than one centrally located GC. The expanding ring of multicast requests further exploits the availability of cryptographic keys on multiple seed nodes and keyed nodes on a network by making requests for the multicast cryptographic key from the closest seed nodes and keyed nodes.

The techniques used by the present invention are also beneficial because they balance the processing load associated with key distribution based on the geographic location of key requests. Each additional cryptographic key request establishes a keyed node which can distribute the cryptographic key to other nearby nodes on the internetwork. Using multiple seed nodes and keyed nodes to distribute the multicast cryptographic key distributes the processing load to many different nodes rather than one group controlloer or GC.

Further, requesting a cryptographic key using an expanding ring locates nearby seed nodes or keyed nodes rather than a distant node on the network. This minimizes network traffic and makes key distribution fast and efficient. Consequently, members in a large multicast group will experience consistent key distribution performance when requesting cryptographic keys even if they are located in different geographic locations.

While specific embodiments have been described herein for purposes of illustration, various modifications may be made without departing from the spirit and scope of the invention. Generally, embodiments of the present invention provide a technique for dynamically balancing the load associated with distributing a group key. Thus, those skilled in the art will understand that embodiments of the present invention are not limited to work secure unicast SKIP but can work with any number of secure unicast key distribution techniques. Those skilled in the art will also understand that the present invention can be implemented using a variety of different networking protocols and is not limited to computer systems coupled to a network using the TCPIP protocol. Alternative embodiments substantially similar to the preferred embodiment could be implemented except that the network protocol would be SNA, Appletalk, IPX, X.25, SLIP, or PPP. Those skilled in the art understand that computer systems running TCP/IP can also communicate with other computer systems running other diverse network protocols such as SNA (Systems Network Architecture), IPX, Appletalk, or X.25. For more information on integrating TCP/IP and SNA networks see *Integrating TCP/IP Into SNA*, Taylor, Wordware Publishers, 1993.

Accordingly, the invention is not limited to the above described embodiments, but instead is defined by the appended claims in light of their full scope of equivalents.

What is claimed is:

1. A method executed on one or more seed nodes and one or more keyed nodes for securely distributing a cryptographic key, initially located on the one or more seed nodes, to a requesting node wherein the one or more seed nodes, the one or more keyed nodes, and the requesting node are each coupled to one or more networks in an internetwork, and wherein the keyed nodes are those nodes which receive the cryptographic key after requesting and receiving the cryptographic key from a seed or keyed node, the method comprising the steps of:

receiving at a node selected from a group consisting of the one or more seed nodes and the one or more keyed nodes a multicast transmission request for the cryptographic key from the requesting node;

encrypting the cryptographic key at the node selected in the receiving step; and transferring from the node selected in the receiving step the encrypted cryptographic key to the requesting node with a secure unicast transmission.

2. The method of claim 1 wherein the receiving step further comprises the steps of:

determining if the requesting node making the multicast request has permission to receive the cryptographic key by performing the following steps, comparing the identity of the requesting node with an authenticated list of nodes having permission to receive the cryptographic key; and responding to the multicast request if the comparing step indicates the requesting node is a member of the list of nodes having permission to receive the cryptographic key.

3. The method of claim 1 further comprising the step of converting the requesting node into a keyed node by configuring the requesting node to perform a method comprising the following steps of:

receiving a multicast transmission request for the cryptographic key from a subsequent requesting node;

encrypting the cryptographic key; and transferring the encrypted cryptographic key to the subsequent requesting node with a secure unicast transmission.

4. The method of claim 1 wherein the cryptographic key is requested by the requesting node to decrypt data being transmitted over a secure multicast transmission between members of a multicast group.

5. The method of claim 1 further including the step of including the one or more seed nodes, the one or more keyed nodes, and the requesting nodes as members of a multicast group.

6. The method of claim 5 further including the step of distributing the one or more seed nodes over the internetwork to minimize the distance over the internetwork between each member of the multicast group on the internetwork and a seed node or a keyed node on the internetwork.

7. The method of claim 1 wherein the multicast request made by the requesting node to the seed node is neither authenticated nor encrypted.

8. The method of claim 1 wherein the secure unicast transmission is performed using unicast SKIP.

9. A method executed on a requesting node coupled to a network on an internetwork for obtaining a cryptographic key from one or more seed nodes and one or more keyed nodes coupled to one or more different networks on the internetwork, wherein each of the one or more seed nodes and the one or more keyed nodes are capable of transmitting the cryptographic key to the requesting node, and wherein the keyed nodes are those nodes which receive the cryptographic key after requesting and receiving the cryptographic key from a seed or keyed node, the method comprising the steps of:

generating a multicast request for the cryptographic key;

transmitting the multicast request for the cryptographic key a predetermined number of hops over the internetwork directed to the one or more seed nodes and the one or more keyed nodes coupled to the internetwork;

waiting for at least one response from at least one seed node or keyed node coupled to the network; and when the at least one response is not received within a time period, increasing the hop count by a hop count increment and repeating the above steps of generating a multicast request, transmitting the multicast request, and delaying a time period.

10. The method of claim 9 further including the step of iteratively performing the steps of generating a multicast request, transmitting the multicast request, delaying a time period, and increasing the hop count until the at least one response is received within the time period.

11. The method of claim 10 wherein the hop count increment is increased exponentially with each iteration.

12. The method of claim 9, further comprising, subsequent to the step of increasing the hop count, the steps of:

receiving the at least one response within the time period in the form of a secure unicast transmission from at least one seed node or keyed node which includes the cryptographic key;

decrypting the secure unicast transmission to obtain the cryptographic key; and converting the requesting node into a keyed node capable of providing the cryptographic key to other requesting nodes located on the internetwork.

13. The method of claim 9 wherein the cryptographic key is requested by the requesting node to decrypt data being transmitted over a secure multicast transmission between members of a multicast group.

14. The method of claim 9 wherein the multicast request made by the requesting node to the one or more seed nodes and the one or more keyed nodes is neither authenticated nor encrypted.

15. The method of claim 12 wherein the secure unicast transmission is performed using unicast SKIP.

16. An apparatus embedded in one or more seed nodes and one or more keyed nodes which securely distributes a cryptographic key, initially located on the one or more seed nodes, to a requesting node wherein the one or more seed nodes, the one or more keyed nodes, and the requesting node are each coupled to one or more networks in an internetwork, and wherein the keyed nodes are those nodes which receive the cryptographic key after requesting and receiving the cryptographic key from a seed or keyed node, the apparatus comprising:

a mechanism embedded in one or more nodes selected from a group consisting of the one or more seed nodes and the one or more keyed nodes, the mechanism being configured to receive a multicast transmission request for the cryptography key from the requesting node;

a mechanism embedded in one or more nodes selected from a group consisting of the one or more seed nodes and the one or more keyed nodes, the mechanism being configured to encrypt the cryptographic key; and a mechanism embedded in one or more nodes selected from a group consisting of the one or more seed nodes and the one or more keyed nodes, the mechanism being configured to transfer the encrypted cryptographic key to the requesting node with a secure unicast transmission.

17. The apparatus of claim 16 wherein the mechanism configured to receive is further comprised of:
   a mechanism configured to determine if the requesting node making the multicast request has permission to receive the cryptographic key by performing the following steps,
      a mechanism configured to compare the identity of the requesting node with an authenticated predetermined list of nodes having permission to receive the cryptographic key; and
      a mechanism configured to respond to the multicast request if the comparing mechanism indicates the requesting node is a member of the predetermined list of nodes having permission to receive the cryptographic key.

18. The apparatus of claim 17, having a mechanism to convert the requesting node into a keyed node capable of distributing the cryptographic key to a subsequent requesting node, further comprising:
   a mechanism configured to receive a multicast transmission request for the cryptographic key from a subsequent requesting node;
   a mechanism configured to encrypt the cryptographic key; and
   a mechanism configured to transfer the encrypted cryptographic key to the subsequent requesting node with a secure unicast transmission.

19. The apparatus of claim 16 wherein the cryptographic key is requested by the requesting node to decrypt data being transmitted over a secure multicast transmission between members of a multicast group.

20. The apparatus of claim 16 further including the step of including the one or more seed nodes, the one or more keyed nodes, and the requesting nodes as members of a multicast group.

21. The apparatus of claim 16 further including an apparatus configured to distribute the one or more seed nodes over the internetwork to minimize the distance over the internetwork between each member of the multicast group on the internetwork and a seed node or a keyed node on the internetwork.

22. The apparatus of claim 16 wherein the multicast request made from the requesting node to the seed node is neither authenticated nor encrypted.

23. The apparatus of claim 16 wherein the secure unicast transmission is performed using unicast SKIP.

24. An apparatus embedded in a requesting node coupled to a network on an internetwork configured to obtain a cryptographic key from one or more seed nodes and one or more keyed nodes coupled to one or more different networks on the internetwork, wherein each of the one or more seed nodes and the one or more keyed nodes are capable of transmitting the cryptographic key to the requesting node, and wherein the keyed nodes are those nodes which receive the cryptographic key after requesting and receiving the cryptographic key from a seed or keyed node, the apparatus comprising:
   a mechanism configured to generate a multicast request for the cryptographic key;
   a mechanism configured to transmit the multicast request for the cryptographic key a predetermined number of hops over the internetwork directed to the one or more seed nodes and the one or more keyed nodes coupled to the internetwork;
   a mechanism configured to delay a time period for at least one response from at least one seed node or keyed node coupled to the network; and
   a mechanism configured to increase the hop coount by a hop count increment when the at least one response is not received within the time period.

25. The apparatus of claim 24 wherein the mechanism configured to increase the hop count increases the hop count increment exponentially each time it is operated.

26. The apparatus of claim 24, further comprising:
   a mechanism configured to receive the at least one response, within the time period, in the form of a secure unicast transmission from at least one seed node or keyed node which includes the cryptographic key;
   a mechanism configured to decrypt the secure unicast transmission to obtain the cryptographic key; and
   a mechanism configured to convert the requesting node into a keyed node capable of providing the cryptographic key to other requesting nodes located on the internetwork.

27. The apparatus of claim 24 wherein the cryptographic key is requested by the requesting node to decrypt data being transmitted over a secure multicast transmission between members of a multicast group.

28. The apparatus of claim 24 wherein the multicast request made by the requesting node to the one or more seed nodes and the one or more keyed nodes is neither authenticated nor encrypted.

29. The apparatus of claim 24 wherein the secure unicast transmission is performed using unicast SKIP.

30. A computer data signal embodied in a carrier wave and representing sequences of instructions which, when executed by a processor, causes one or more seed nodes and one or more keyed nodes to securely distribute a cryptographic key, initially located on the one or more seed nodes, to a requesting node wherein the one or more seed nodes, the one or more keyed nodes, and the requesting node are each coupled to one or more networks in an internetwork, and wherein the keyed nodes are those nodes which receive the cryptographic key after requesting and receiving the cryptographic key from a seed or keyed node, by performing the following steps of:
   receiving at a node selected from a group consisting of the one or more seed nodes and the one or more keyed nodes a multicast transmission request for the cryptographic key from the requesting node;
   encrypting the cryptographic key at the node selected in the receiving step; and
   transferring from the node selected in the receiving step the encrypted cryptographic key to the requesting node with a secure unicast transmission.

31. The data signal embodied in a carrier wave of claim 30 wherein the receiving step further comprises the steps of:
   determining if the requesting node making the multicast request has permission to receive the cryptographic key by performing the following steps,
      comparing the identity of the requesting node with an authenticated list of nodes having permission to receive the cryptographic key; and
      responding to the multicast request if the comparing step indicates the requesting node is a member of the list of nodes having permission to receive the cryptographic key.

32. The data signal embodied in a carrier wave of claim 30 further comprising the step of converting the requesting node into a keyed node by configuring the requesting node to perform a method comprising the following steps of:

receiving a multicast transmission request for the cryptographic key from a subsequent requesting node;

encrypting the cryptographic key; and transferring the encrypted cryptographic key to the subsequent requesting node with a secure unicast transmission.

33. The data signal embodied in a carrier wave of claim 30 wherein the cryptographic key is requested by the requesting node to decrypt data being transmitted over a secure multicast transmission between members of a multicast group.

34. The data signal embodied in a carrier wave of claim 30 further including the step of including the one or more seed nodes, the one or more keyed nodes, and the requesting nodes as members of a multicast group.

35. The data signal embodied in a carrier wave of claim 34 further including the step of distributing the one or more seed nodes over the internetwork to minimize the distance over the internetwork between each member of the multicast group on the internetwork and a seed node or a keyed node on the internetwork.

36. The data signal embodied in a carrier wave of claim 30 wherein the multicast request made by the requesting node to the seed node is neither authenticated nor encrypted.

37. The data signal embodied in a carrier wave of claim 30 wherein the secure unicast transmission is performed using unicast SKIP.

38. A computer data signal embodied in a carrier wave and representing sequences of instructions which, when executed by a processor, causes a requesting node coupled to a network on an internetwork to obtain a cryptographic key from one or more seed nodes and one or more keyed nodes coupled to one or more different networks on the internetwork, wherein each of the one or more seed nodes and the one or more keyed nodes are capable of transmitting the cryptographic key to the requesting node, and wherein the keyed nodes are those nodes which receive the cryptographic key after requesting and receiving the cryptographic key from a seed or keyed node, by performing the following steps of:

generating a multicast request for the cryptographic key;

transmitting the multicast request for the cryptographic key a predetermined number of hops over the internetwork directed to the one or more seed nodes and the one or more keyed nodes coupled to the internetwork;

waiting for at least one response from at least one seed node or keyed node coupled to the network; and when the at least one response is not received within a time period, increasing the hop count by a hop count increment and repeating the above steps of generating a multicast request, transmitting the multicast request, and delaying a time period.

39. The method of claim 38 further including the step of iteratively performing the steps of generating a multicast request, transmitting the multicast request, delaying a time period, and increasing the hop count until the at least one response is received within the time period.

40. The computer data signal embodied in a carrier wave of claim 39 wherein the hop count increment is increased exponentially with each iteration.

41. The computer data signal embodied in a carrier wave of claim 38, further comprising, subsequent to the step of increasing the hop count, the steps of:

receiving the at least one response within the time period in the form of a secure unicast transmission from at least one seed node or keyed node which includes the cryptographic key;

decrypting the secure unicast transmission to obtain the cryptographic key; and converting the requesting node into a keyed node capable of providing the cryptographic key to other requesting nodes located on the internetwork.

42. The computer data signal embodied in a carrier wave of claim 38 wherein the cryptographic key is requested by the requesting node to decrypt data being transmitted over a secure multicast transmission between members of a multicast group.

43. The computer data signal embodied in a carrier wave of claim 38 wherein the multicast request made by the requesting node to the one or more seed nodes and the one or more keyed nodes is neither authenticated nor encrypted.

44. The computer data signal embodied in a carrier wave of claim 41 wherein the secure unicast transmission is performed using unicast SKIP.

45. The method of claim 1 wherein the group has at least two nodes capable of securely distributing the cryptographic key to the requesting node.

* * * * *